Patented Aug. 20, 1946

2,406,133

UNITED STATES PATENT OFFICE 2,406,133

PROCESS FOR OBTAINING PROVITAMIN D

William S. Calcott, Woodstown, N. J., and George E. Holbrook and Stockton G. Turnbull, Jr., Wilmington, Del., assignors to E. I. du Pont de Nemours & Company, Wilmington, Del., a corporation of Delaware No Drawing. Application July 11, 1942,
Serial No. 450,632

7 Claims. (Cl. 167—81)

This invention relates to a new and improved method for obtaining fat-soluble compounds and more particularly refers to a process for separating provitamin D from animal organisms containing the same.

Heretofore fat-soluble substances generally, and in particular provitamin D, were obtained from animal organisms by treating them with a saponifying agent which was generally an alcohol-water solution of caustic soda. Where the animal organism was enclosed in a protective shell as in the case of shellfish, it was first necessary to remove this shell before subjecting its contents to the foregoing saponification treatment. Needless to say, this process was tedious and expensive.

A further disadvantage of the prior art was the necessity of employing extremely large quantities of saponifying solution for the recovery of a small amount of provitamin D. This, too, resulted in a great increase in the cost of the process because of increased handling charges, the necessity of using extraordinarily large amounts of organic solvents for recovering the provitamin D from the saponifying solution and the loss of appreciable amounts of these expensive agents.

It is an object of the present invention to overcome the aforesaid disadvantages and other disadvantages directly or indirectly resulting therefrom. A further object is to obtain fat-soluble constituents from animal organisms containing the same in a simple and more economical manner than was heretofore possible. A still further object is to obtain solutions of provitamin D from shellfish by means of a process wherein the expensive removal of the shell is avoided, the use of alcohol is unnecessary and the amount of chemical agents necessary is greatly reduced. A still further object is to obtain solutions of provitamin D from mussels and other shellfish in a more concentrated and cheaper manner than was heretofore possible. Additional objects will become apparent from a consideration of the following specification and claims.

These objects are attained in accordance with the present invention wherein fat-soluble constituents are removed from animal organisms by treating said organisms in the presence of such protective coatings as they may possess with a saponifying solution, removing the protective coating from the reaction zone and repeating the process with additional organisms but the original saponifying liquor until a concentrated liquor of fat-soluble constituents is obtained. In a more restricted sense this invention pertains to the treatment of mussels and other shellfish with a saponifying solution for a sufficient period of time and under such conditions as to release the provitamin D content thereof into the saponifying liquor, and the reuse of such liquor in the extraction of provitamin D from additional mussels or shellfish. In a still more restricted sense this invention is concerned with a process whereby mussels or other shellfish are crushed, the crushed mass treated with a saponifying solution, the shells and other insoluble constituents thereafter removed from the reaction zone and additional quantities of crushed mussels or shellfish introduced into said reaction zone for a similar treatment. The process is continued until the concentration of provitamin D in the saponifying liquor is sufficiently high to render its subsequent handling and extraction with organic solvents economically feasible. In its preferred embodiment this invention is concerned with the treatment of mussels to obtain therefrom their provitamin D content by washing, steaming and draining the mussels, crushing the shells thereof and subjecting the resulting mass of cracked shell and meat to the action of a saponifying solution of aqueous sodium hydroxide solution for a sufficient period of time and under such conditions as to release substantially all the provitamin D, removing the shells from said solution and repeating the process with additional mussels, treated as aforesaid, and the original saponifying solution until the liquor becomes highly concentrated in provitamin D.

The invention may be more readily understood by a consideration of the following illustrative examples:

EXAMPLE 1

*Production of provitamin D from the mussel, Modiolus demissus (Dillwyn)*

Into a vessel containing 20.5 parts of 15% (by weight) caustic there was lowered a perforated basket which contained the "crackings" ("crackings" is a term used to describe the animal after it has been washed, steamed, drained and cracked or crushed) from 30.0 parts of whole mussels of the species, Modiolus demissus (Dillwyn). The temperature of the caustic was kept at 95–97° C. for one-half hour, and then the basket, which now contained nothing but shells, was raised from the vessel. The caustic liquor was allowed to drain back into the saponification vessel. The basket and shells were then washed by immersion in water so that any provitamin D in the caustic solution adhering to the shells would not be lost.

To the caustic liquor in the saponification vessel there was added 0.50 part of solid flake caustic, and another saponification operation was performed on the "crackings" from 30.0 parts of whole mussels. The shells after being stripped of the meat were washed in the same wash water used after the previous saponification. In the same manner, using the same caustic liquors and same wash water, throughout, the meat was removed from thirty batches of "crackings," each from 30.0 parts of whole mussels. After the last batch of "crackings" had been processed in this manner, the caustic liquor in the saponification vessel was held at 95–97° C. for four hours and was then withdrawn. The wash water liquor was then put into the saponification vessel, sufficient flake caustic was added to give a 15% caustic solution, and thirty more batches of "crackings" from 30 parts of whole mussels, were consecutively processed as outlined above.

The saponification liquor, after being heated at 95–97° C. was twice extracted with an appropriate solvent such as ethyl ether, in the proportion of 3 parts of caustic liquor to one part of ether. The combined ether extracts were washed with water and the ether was removed by distillation. The unsaponifiable matter was obtained as an oily solid, which was dissolved in ten parts of hot alcohol. On cooling, the sterols containing the provitamin D crystallized in beautiful white crystals. These sterols may be further purified by recrystallization, decolorization with charcoal or animal black, conversion to esters, followed by subsequent saponification, chromatographic adsorption, etc. An essentially quantitative yield (based on analytical methods of assay) of provitamin D is obtained by this procedure.

EXAMPLE 2

*Production of provitamin D from the periwinkle, Littorina littorea*

By the method outlined in Example 1, 20 batches of "crackings," each from 30 parts of the live univalve, Littorina littorea, were stripped of the meat in 16 parts of 15% caustic. The saponification liquor was then extracted with ether, which on concentration gave crude sterols. These after one recrystallization from alcohol gave almost colorless sterols with a 14% provitamin D content determined by spectrographic assay.

EXAMPLE 3

*Provitamin D from the oyster drill, Urosalpinx cinereus*

By a repetition of the process outlined in Example 1, 25 batches of "crackings," each from 30 parts of the oyster drill Urosalpinx cinereus, were stripped of the meat in 20 parts of 15% caustic. The provitamin D, admixed with other sterols, was obtained quantitatively in the form of white crystals by crystallization from alcohol.

Other oyster drills, such as the domestic drill Eupleura candata (Say) and the foreign hedgehog murex (Murex erinaceus, Linn.) may be used as sources of provitamins D.

EXAMPLE 4

*Provitamin D from the mussel, Mytilus hamatus, Say*

The "crackings" from 20 batches of 30.0 parts each of these whole mussels, which are also known as the hooked mussel, were processed by the method given in Example 1. The sterols containing the provitamin D were isolated in almost quantitative yield by crystallization from alcohol.

EXAMPLE 5

*Provitamin D from the giant conch, Strombus gigas, Linn.*

The "crackings" from 15 batches of 30.0 parts each of the whole conch were processed as described in the previous examples to obtain almost all of the provitamin D originally present mixed with other sterols.

EXAMPLE 6

*Provitamin D from fresh water mussels*

These mussels, which are all Lamellibranchia, are of the family Unionidae, which comprises 60 or more genera, among which may be listed the Quadrula, Pleurobema, Unis, Anodonta, Lampsilis, Tritigonia, Cyplas, Thepalia, etc. These are known in various locations as niggerheads, sand shells, pig toes, maple leaves, buckhorns, washboards, three ridges, pink elephant ears, pocketbooks, etc.

The "crackings" from ten batches of 30.0 parts each of a mixture of these fresh water mussels were treated as described previously, and the provitamin D and other sterols were isolated in the usual manner.

EXAMPLE 7

*Provitamin D from the crab, Cancer pagurus*

The "crackings" from ten batches of 50.0 parts each of the steamed crabs were exposed to the action of the same 15% caustic at 95–100° C. for one hour per batch. The caustic liquors, when processed as described previously, yielded the sterols.

It is to be understood that the foregoing examples are illustrative merely of a few of the many modifications of which this invention is capable. They may be varied widely both with respect to the individual reactants and the conditions of reaction without departing from the scope of this invention.

In place of the mussels and other shellfish referred to in the examples, or in addition thereto, any substance containing fat-soluble constituents may be employed; in particular, any substance containing provitamin D. As a general rule it may be stated that the use of shellfish is more desirable for the production of the largest quantity of provitamin D at the most reasonable cost. Among the many types of shellfish which are contemplated for use herein, in addition to those referred to in the examples, mention may be made of oysters, clams, shrimp, scallops, "coon" oysters, "Japanese oysters," sea snails, lobsters and the like. While the use of shellfish generally, and mussels particularly is preferred, it is contemplated that other bony animals or fish may be processed in accordance with the instructions hereof.

It is advisable to first clean the shellfish or other sources of provitamin D; this may be done by washing them thoroughly. Then the shellfish may be treated with live steam or hot water at atmospheric or superatmospheric pressure. This steaming treatment is particularly helpful when it is desired to relax the muscles holding the shells together. The water which is "bound" in the animal may then be drained out in order to prevent undue dilution of the saponifying solution to be subsequently used. At this stage the mussel or other shellfish may be cracked in order to rupture its shell and permit more intimate contact of its content with the chemical agents. Cracking may advisably be accomplished in a corn mill, hammer mill, ice cracker or similar apparatus.

It is to be understood that the order of the aforesaid steps may be changed and some of them may be omitted entirely, if desired. For instance, the animal may be steamed and cracked open prior to washing. Likewise, the cracking, crushing or steaming operation may be omitted, although this results in a longer period for stripping and more dilution of the saponifying solution.

The animal is then treated with a saponifying solution in order to prepare the fat-soluble constituents for extraction. The preferred saponifying solution is aqueous sodium hydroxide, but numerous other solutions or mixtures thereof may be used with satisfactory results. For example, hydroxides and oxides of the alkali and alkaline earth groups; salts of the strong bases with weak acids such as sodium acetate, sodium carbonate, etc.; aqueous solutions of organic bases such as tetramethyl ammonium hydroxide, pyridine, etc. As strong acids may be injurious to the fat-soluble constituents, their use is not ordinarily advisable.

The strength of the saponifying solution, the temperature thereof and the time of treatment may be varied widely without appreciably affecting the desirable results. As a general rule it is advisable to maintain the temperature at a sufficiently elevated level to permit rapid chemical attack upon the meat, and saponification of its fat content. In this connection, however, care should be observed not to elevate the temperature to such an extent as to destroy any appreciable amount of provitamin D.

When the provitamin D and/or other fat-soluble constituents are released by the saponifying solution the shells, if any, and/or other insoluble constituents should be removed from the reaction zone. Since the materials so removed may contain some provitamin D and/or other fat-soluble constituents, it is generally advisable to wash them and recover the saponifying agent and sterols adhering thereto. The so recovered materials may then be added to the saponification solution at that time or at some later stage in the process.

The operation may then be repeated using a fresh supply of provitamin-D-containing materials or of materials containing other fat-soluble constituents. These materials may be treated in the same preliminary manner as previously mentioned. In this subsequent operation the same saponifying solution is used as for the first stage of the process. It is understood, of course, that this solution now contains the fat-soluble constituents removed from the first batch of shellfish or other raw materials. Likewise, this solution may have added thereto additional saponifying agent in order to maintain its strength at the optimum level.

As previously mentioned, the process may be repeated until the concentration of provitamin D and/or other fat-soluble constituents in the saponifying liquor has reached the optimum economic level. This level may be, and generally is, many times the concentration of the material in the solution after the initial saponification treatment. It is understood, however, that there are no precise limits on the degree of concentration of fat-soluble constituents except that it is appreciably greater than for a single operation.

When the saponification liquor contains the desired amount of provitamin D and/or other fat-soluble constituents; it is advisably heated at a sufficient temperature and for a sufficient period of time to complete the saponification reaction. This temperature and time may vary with the materials being treated and with the number and type of operations to which they have already been subjected. The usual expedients for bringing this reaction to completion may be relied upon, such as for example, superatmospheric pressures, etc.

When the saponification reaction is completed or brought to the desired degree of partial completion the provitamin D or other fat-soluble constituents may be removed therefrom in known manner, such as by the use of suitable organic solvents. The preferred solvents for this purpose are ethyl ether, chlorinated hydrocarbons, benzene and petroleum ether, although it is understood that numerous other agents or combinations thereof may likewise be used.

This latter extraction operation may be modified considerably without defeating the objects of this invention. As an illustration, the saponified materials may be converted to insoluble soaps, for example, by treatment with calcium salts. This insoluble soap would then adsorb the provitamin D or other sterols. The so precipitated materials may then be separated from the liquid portion of the reaction mass by filtration, and the sterols recovered from the residue by extraction with ether or related solvents.

In the same manner the process may be modified by introducing fine streams of warm benzene below the surface of the warm saponification liquor.

The fat-soluble constituents obtained in the foregoing manner, and in particular provitamin D, may be isolated and purified, if desired, in known manner. For instance, the provitamin D may be crystallized by cooling. It may be further purified by recrystallization, decolorization with charcoal or animal black, conversion to esters, followed by subsequent saponification, chromatographic adsorption and the like.

By means of the present invention prior art processes for the recovery of provitamin D and other fat-soluble materials are greatly simplified and rendered much more economical. When the source of raw material is a shellfish this process permits the desired result to be obtained without the tedious and expensive handling operations previously believed to be necessary. Likewise, it eliminates the solvent extraction of the fat from the meat of the animal prior to saponification. This invention furthermore permits the recovery of valuable provitamin D without the use of large quantities of an organic water-miscible solvent such as acetone or alcohol, which are customary in the saponification reaction. A very valuable group of materials is therefore rendered available at an appreciable savings in cost. Likewise, numerous sources of these valuable materials which formerly were unavailable because of the prohibitive cost of treatment, are now made commercially feasible.

As many apparently widely different embodiments of this invention may be made without departing from the spirit and scope thereof, it is to be understood that the invention is not limited to the specific embodiments thereof except as defined in the appended claims.

We claim:

1. A process for obtaining provitamin D from shellfish which comprises treating said shellfish with a saponifying solution to remove therefrom material containing provitamin D, separating the shells from the saponifying liquor and reusing said liquor for the extraction of material containing provitamin D from additonal shellfish.

2. A process for obtaining provitamin D from shellfish which comprises treating said shellfish with a saponifying solution to remove therefrom material containing provitamin D, separating the shells from the saponifying liquor and reusing said liquor for the extraction of material containing provitamin D from additional shellfish until a concentrated solution of provitamin D is obtained.

3. A process for obtaining provitamin D from mussels which comprises treating said mussels with a saponifying solution to remove therefrom substantially all the material containing provitamin D, separating the shells from the saponifying liquor and reusing said liquor for the extraction of material containing provitamin D from additional mussels until a concentrated solution of provitamin D is obtained.

4. A process for obtaining provitamin D from mussels which comprises treating cracked mussels, after they have been washed, steamed and drained, with a saponifying solution to remove therefrom substantially all the material containing provitamin D, separating the shells from the saponifying liquor and reusing said liquor for the extraction of material containing provitamin D from additional mussels.

5. A process for obtaining provitamin D from mussels which comprises treating cracked mussels, after they have been washed, steamed and drained, with a saponifying solution of aqueous sodium hydroxide to remove therefrom substantially all the material containing provitamin D, separating the shells from the saponifying liquor and reusing said liquor for the extraction of material containing provitamin D from additional mussels until a concentrated solution of provitamin D is obtained.

6. A process for obtaining provitamin D from mussels which comprises treating cracked mussels with a saponifying solution of aqueous sodium hydroxide to remove therefrom material containing provitamin D, and separating the shells from the saponifying liquor.

7. In a process of obtaining the unsaponifiable fraction from shell fish the step which comprises treating the whole broken open shell fish with caustic alkali to saponify the saponifiable constituents and liquefy the shell fish meat.

WILLIAM S. CALCOTT.
GEORGE E. HOLBROOK.
STOCKTON G. TURNBULL, Jr.